PROCESS FOR PRODUCING BORON TRICHLORIDE

Sheldon L. Clark, Kenmore, and Theodore L. Heying, Tonawanda, N.Y., assignors to Olin Mathieson Chemical Corporation, a corporation of Virginia
No Drawing. Filed Feb. 14, 1958, Ser. No. 715,474
2 Claims. (Cl. 23—205)

This invention relates to the production of boron trichloride.

Boron trichloride is a gas at ordinary temperatures having a boiling point of approximately 125° C. It is conventionally prepared by passing chlorine over mixtures of boron oxide and carbon heated to elevated temperatures of approximately 1000° to 1200° F. Boron trichloride can be employed in a reaction with lithium borohydride in diethyl ether to produce diborane according to the method described, for example, in Smith and Wood application Serial No. 674,971, filed July 29, 1957, now Patent No. 2,983,582.

The pyrolysis of diborane to form higher boron hydrides is well known. The operation can be carried out, for example, at a pressure within the range from 0 to 100 p.s.i.g., at a temperature within the range from 150° C. to 300° C. and with a residence time in the pyrolysis zone of from about 1 second to 6 seconds. The diborane pyrolyzed can be in admixture with diluent hydrogen introduced into the pyrolysis zone along with the diborane, the amount of diluent hydrogen being from about 25 to 95 percent by weight, based upon the weight of the diborane. The pyrolysis of the diborane results in the production of tetraborane, pentaborane-9, pentaborane-11, decaborane and so forth. Note, for example, the article by McCarty and DiGiorgio appearing on pages 3138 to 3143 of the July 1951 issue of the Journal of the American Chemical Society.

Frequently, in diborane pyrolysis a yellow solid is formed in addition to the aforementioned borohydrides. This solid is a mixture of polymerized higher boron hydrides higher than decaborane. The solid can be separated from the decaborane with the aid of kerosene, decaborane being more soluble in kerosene than the yellow solid. This is described, for example, in Zaslowsky and Madaus application Serial No. 560,113, filed January 19, 1956, now Patent No. 2,983,590. The yellow solid is in general chemically inert and resists efforts to convert it into readily usable chemical compounds. Sometimes, over 50 percent of the end product of the diborane pyrolysis consists of the yellow solid. The boron lost in this by-product adds to the cost of the pyrolysis operation and, of course, lowers the yield of the desired borohydrides, chiefly pentaborane-9 and decaborane. The yellow solid, in addition to representing a loss, also presents a disposal problem inasmuch as it is hazardous to handle.

In accordance with the present invention, a method has been devised whereby the yellow solids just described can be converted to boron trichloride. This is accomplished by contacting the yellow solid with chlorine gas and recovering boron trichloride from the reaction products. Advantageously the reaction is carried out at a temperature within the range from 50° C. to 550° C. Thus by the process of this invention, the boron values represented by yellow solids and ordinarily lost in the pyrolysis of diborane can be recovered and utilized to produce further quantities of diborane.

The following examples illustrate various embodiments falling within the scope of this invention. In these examples the reaction was performed in a cylindrical reactor about 13 inches long having a diameter of about 1 inch and heated by an electric tube furnace. A porous disc, located about 5 inches from the top of the reactor, was used as a support for the bed of yellow solid obtained by the pyrolysis of diborane. A thermowell immediately above this bed recorded the reaction temperature. The chlorine feed as well as the nitrogen purge was passed through the solids from the bottom. A vycor reactor was used at temperatures above 450° C. while a pyrex tube was used in experiments at or below 450° C.

A weighed quantity of yellow solid was placed in the reactor on the porous disc or supported on charcoal in some experiments. The reactor was heated to and maintained at the desired temperature while the system was purged with nitrogen. After the system had been thoroughly swept with nitrogen, the desired amount of chlorine was passed through the yellow solids for a predetermined time. The exhaust gases were passed through a trap maintained at 0° to −10° C. to separate the $BCl_3$ from the small amounts of HCl, CO, and $CO_2$ present in the effluent gases. In later experiments, after the presence of boron trichloride in the exhaust gases had been definitely established, the effluent stream was passed directly through a hydrolysis tower containing a 10 percent solution of sodium hydroxide which converted the $BCl_3$ to sodium borate.

An infrared analysis of the material in the trap maintained at 0° to −10° C. showed only the presence of boron trichloride. At no time were other boron containing compounds found in the infrared spectrum. The solution from the hydrolysis tower was analyzed for elemental boron, and the uncorrected yield of $BCl_3$ was calculated as shown in the following equation:

$$100 \times \frac{\text{grams boron present in hydrolysis tower}}{\text{grams boron in borane polymer sample}} = \text{uncorrected yield}$$

The very small amount of residue generally remaining in the reactor did not allow the calculation of a corrected yield.

EXAMPLE I

Yellow solid obtained by the pyrolysis of diborane, 0.109 gram, was placed on the porous disc in the reactor and the entire system was flushed with nitrogen as the temperature in the reactor was gradually raised to 550° C. When the desired temperature was obtained, the nitrogen flush was terminated and chlorine was passed through at a rate of 0.12 gram per minute for 35 minutes for a total chlorine input of 4.2 grams. The boron polymer used in this experiment contained 73.1 percent boron so that 0.0795 gram of boron was charged to the reactor. After the reaction had been terminated, the system was flushed with nitrogen for 15 minutes at 550° C. and for an additional 10 minutes as the reactor was allowed to cool to room temperature. Infrared analysis of the effluent gases from the reactor taken at intervals showed that boron trichloride and small amounts of HCl, CO, and $CO_2$ were obtained. The effluent gases were continually passed through a hydrolysis tower containing a 10 percent solution of sodium hydroxide which converted the boron trichloride to sodium borate. An analysis of this hydrolysis scrubber showed the presence of 0.0715 gram of boron which corresponds to an uncorrected yield of 90 percent $BCl_3$. A small amount of a dark residue remained in the reactor, but was too small an amount to determine the boron content for any yield correction purpose. This example is summarized in Table I.

EXAMPLE II

This example was conducted in the same manner as

Example I with the exception that the yellow solid was supported on 0.117 gram of charcoal. The yellow solid weighed 0.143 gram and contained 0.105 gram of boron. The reaction was conducted at 550° C. for a total of 35 minutes during which time 4.2 grams of chlorine was passed through the solid at the rate of 0.012 gram per minute. A total of 0.097 gram of boron trichloride was obtained. This corresponds to an uncorrected yield of 92.6 percent $BCl_3$. This example is also summarized in Table I.

The following Tables I and II set forth the pertinent data from other examples which were conducted generally according to the procedures of Examples 1 and 2. Table II compares results obtained in certain groups of experiments performed under identical conditions except that the total chlorine feed was varied. The results at 350° C. indicate that best yields are obtained when twice the theoretical amount of chlorine required for complete reaction is employed. The results at 100° C. are inconclusive. The rate of flow of chlorine appears to have no direct effect upon the yield of boron trichloride.

Table I

| Example | Temp., °C. | Cl₂ Flow, grams/min. | Time, min. | Total Cl₂, grams | Yellow Solid, grams[1] | Boron in solid, gms. | Carbon, grams | Residue, grams | Boron as BCl₃, gms. | Percent Yield BCl₃ uncorr.[2] |
|---|---|---|---|---|---|---|---|---|---|---|
| 1 | 550 | 0.12 | 35 | 4.2 | 0.109 | .0795 | 0 | | .0715 | 90.0 |
| 2 | 550 | 0.12 | 35 | 4.2 | 0.143 | .105 | 0.117 | 0.118 | .097 | 92.6 |
| 3 | 550 | 0.12 | 65 | 7.8 | 0.500 | .366 | 0.50 | | .333 | 90.6 |
| 4 | 550 | 0.12 | 80 | 9.6 | 0.500 | .366 | 0.70 | | .246 | 67.2 |
| 5 | 550 | 0.12 | 90 | 10.8 | 0.500 | .366 | 0.50 | | .196 | 53.5 |
| 6 | 550 | 0.12 | 120 | 14.4 | 0.500 | .366 | 0.50 | | .308 | 84.1 |
| 7 | 550 | 0.15 | 90 | 13.5 | 0.500 | .366 | 0.50 | | .326 | 89.1 |
| 8 | 500 | 0.12 | 46 | 5.5 | 0.190 | .139 | 0 | | .121 | 87.1 |
| 9 | 450 | 0.12 | 41 | 4.9 | 0.167 | .122 | 0 | | .109 | 89.4 |
| 10 | 450 | 0.12 | 52 | 6.2 | 0.211 | .154 | 0 | .042 | .126 | 81.8 |
| 11 | 400 | 0.12 | 54 | 6.5 | 0.222 | .162 | 0 | .036 | .139 | 85.8 |
| 12 | 350 | 0.12 | 39 | 4.7 | 0.161 | .118 | 0 | .022 | .105 | 88.9 |
| 13 | 300 | 0.12 | 54 | 6.5 | 0.221 | .162 | 0 | .043 | .135 | 83.3 |
| 14 | 250 | 0.12 | 43 | 5.2 | 0.177 | .129 | 0 | .075 | .091 | 70.2 |
| 15 | 200 | 0.12 | 42 | 5.1 | 0.174 | .127 | 0 | .066 | .091 | 71.4 |
| 16 | 200 | 0.12 | 50 | 6.0 | 0.207 | .151 | 0.200 | .352 | .088 | 58.2 |
| 17 | 150 | 0.12 | 47 | 5.6 | 0.193 | .141 | 0 | .114 | .082 | 58.3 |
| 18 | 100 | 0.12 | 59 | 7.1 | 0.245 | .207 | 0 | .112 | .128 | 62.6 |
| 19 | 50 | 0.12 | 37 | 4.4 | 0.153 | .112 | 0 | .088 | .072 | 63.9 |
| 20 | 25 | 0.12 | 47 | 5.6 | 0.192 | .140 | 0 | .012 | .195 | 8.6 |

[1] Boron polymer (yellow solids) contained 73.1 percent boron, 6.41 percent hydrogen, 5.84 percent carbon, balance was probably oxygen.
[2] 99.1 percent boron accountability.

Table II

CHLORINE EFFICIENCY AT 350° C. (0.12 GRAM Cl₂/MIN.)

| Example | Cl₂ Time, Min. | Total Cl₂, grams | Yellow Solid, grams | Boron in solid, gms. | Boron as BCl₃, gms. | Residue, grams | Percent Yield BCl₃ | Cl₂ Used, Cl₂ Theo. Req. |
|---|---|---|---|---|---|---|---|---|
| 12 | 39 | 4.7 | .161 | .118 | .105 | .022 | 88.9 | 4/1 |
| 21 | 13.5 | 1.62 | .172 | .126 | .080 | .041 | 63.7 | 1/1 |
| 22 | 25 | 3.00 | .210 | .154 | .126 | .019 | 81.9 | 1.5/1 |
| 23 | 21 | 2.52 | .134 | .098 | .085 | .021 | 86.8 | 2/1 |

CHLORINE EFFICIENCY AT 100° C. (0.12 GRAM Cl₂/MIN.)

| Example | Cl₂ Time, Min. | Total Cl₂, grams | Yellow Solid, grams | Boron in solid, gms. | Boron as BCl₃, gms. | Residue, grams | Percent Yield BCl₃ | Cl₂ Used, Cl₂ Theo. Req. |
|---|---|---|---|---|---|---|---|---|
| 18 | 59 | 7.1 | .254 | .207 | .112 | .128 | 62.6 | 4/1 |
| 24 | 13.5 | 1.62 | .173 | .127 | .089 | .059 | 70.4 | 1/1 |
| 25 | 21 | 2.52 | .179 | .130 | .077 | .094 | 58.9 | 1.5/1 |

CHLORINE EFFICIENCY AT 100° C. (0.24 GRAM Cl₂/MIN.)

| Example | Cl₂ Time, Min. | Total Cl₂, grams | Yellow Solid, grams | Boron in solid, gms. | Boron as BCl₃, gms. | Residue, grams | Percent Yield BCl₃ | Cl₂ Used, Cl₂ Theo. Req. |
|---|---|---|---|---|---|---|---|---|
| 26 | 11.5 | 2.76 | .147 | .108 | .077 | .040 | 71.5 | 2/1 |
| 27 | 7.2 | 1.73 | .182 | .133 | .098 | .039 | 73.8 | 1/1 |

We claim:
1. A process for the production of boron trichloride which comprises pyrolyzing diborane in a first reaction zone under conditions providing products including a mixture of boron hydrides higher than decaborane, separating the mixture of boron hydrides higher than decaborane from the other pyrolysis products, separately reacting the mixture of boron hydrides higher than decaborane in a second reaction zone at a temperature within the range from about 50° to 550° C. with a gas stream consisting essentially of chlorine, and recovering boron trichloride from the reaction products.

2. The method of claim 1 wherein the reaction in the second reaction zone is carried out at a temperature within the range from about 300° to about 550° C. and wherein the molar proportion of chlorine to the molar proportion of boron in the mixture of boron hydrides higher than decaborane is 3:1.

References Cited in the file of this patent

Stock et al: (I)—"Deutsche Chemische Gesellschaft" Berichte, vol. 47, July–Dec. 1914, pp. 3115–3149.

Stock et al.: (II)—"Deutsche Chemische Gesellschaft" Berichte, vol. 69, —Jan.–June 1936, pp. 1469–1475.

Hurd: "Chemistry of the Hydrides," pages 81, 82 (1952).

UNITED STATES PATENT OFFICE
CERTIFICATE OF CORRECTION

Patent No. 3,030,185            April 17, 1962

Sheldon L. Clark et al.

It is hereby certified that error appears in the above numbered patent requiring correction and that the said Letters Patent should read as corrected below.

Column 1, line 13, for "$125°$ C." read -- $12.5°$ C. --.

Signed and sealed this 4th day of September 1962.

(SEAL)
Attest:

ERNEST W. SWIDER
Attesting Officer

DAVID L. LADD
Commissioner of Patents